United States Patent
Wang et al.

(10) Patent No.: US 10,680,328 B2
(45) Date of Patent: Jun. 9, 2020

(54) METHOD AND APPARATUS FOR DETECTING CONNECTION LINE ORDER OF ELECTRICAL TILTING ANTENNA

(71) Applicant: ZTE CORPORATION, Guangdong (CN)

(72) Inventors: Boming Wang, Guangdong (CN); Rong Guo, Guangdong (CN); Tiansheng Guo, Guangdong (CN); Yonghong Chen, Guangdong (CN); Baoguo Lei, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 252 days.

(21) Appl. No.: 15/738,737

(22) PCT Filed: Jan. 29, 2016

(86) PCT No.: PCT/CN2016/072744
§ 371 (c)(1),
(2) Date: Dec. 21, 2017

(87) PCT Pub. No.: WO2017/000552
PCT Pub. Date: Jan. 5, 2017

(65) Prior Publication Data
US 2018/0198205 A1   Jul. 12, 2018

(30) Foreign Application Priority Data
Jun. 29, 2015  (CN) .......................... 2015 1 0369065

(51) Int. Cl.
*H01Q 3/34*      (2006.01)
*H04B 1/707*    (2011.01)
*H04W 64/00*    (2009.01)

(52) U.S. Cl.
CPC ............... *H01Q 3/34* (2013.01); *H04B 1/707* (2013.01); *H04W 64/003* (2013.01)

(58) Field of Classification Search
CPC ........................................................ H01Q 3/34
(Continued)

(56) References Cited

U.S. PATENT DOCUMENTS

2003/0147353 A1* 8/2003 Clarkson ............... H04W 24/00
                                                               370/252
2012/0252525 A1* 10/2012 Frenger ............. H04W 52/0206
                                                               455/524
(Continued)

FOREIGN PATENT DOCUMENTS

CN  101741418 A  6/2010
CN  101771197 A  7/2010
(Continued)

OTHER PUBLICATIONS

"3rd Generation Partnership Project; Technical Specification Group Radio Access Network; Utran Iuant Interface: Remote Electrical Tilting (RET) Antennas Application Part (RETAP) Signalling (Release 7)", 3GPP Standard, No. V7.5.0, pp. 1-41 (Mar. 1, 2007).
(Continued)

*Primary Examiner* — Ricky Ngon
(74) *Attorney, Agent, or Firm* — Cantor Colurn LLP

(57) ABSTRACT

A method for automatically detecting connection line order of electrical tilt antennas, includes: adjusting, by an electrical adjustment unit, electric down-tilts of electrical tilt antennas corresponding to the electrical adjustment unit, and collecting, by antenna portals, pre-determined parameters of reflected signals corresponding to n electric down-tilts; calculating statistical characteristic parameters of the pre-determined parameters according to the values of the pre-determined parameters of the reflected signals correspond-
(Continued)

ing to n electric down-tilts and a pre-determined mathematical statistics algorithm, the statistical characteristic parameters being used to represent the discrete degree of the pre-determined parameters; and if the value of the statistical characteristic parameter is greater than a pre-determined threshold, the connection line order between the electrical tilt antennas and a base station being determined to be correct.

17 Claims, 5 Drawing Sheets

(58) Field of Classification Search
USPC .......................................................... 702/179
See application file for complete search history.

(56) References Cited

U.S. PATENT DOCUMENTS

| 2013/0072259 A1* | 3/2013 | Kusano | H04W 28/08 455/561 |
| 2013/0090128 A1* | 4/2013 | Sawamoto | H04W 24/02 455/452.2 |
| 2015/0126173 A1* | 5/2015 | Dribinski | H01Q 3/00 455/418 |
| 2016/0165462 A1* | 6/2016 | Tan | H04W 24/02 370/254 |
| 2016/0165469 A1* | 6/2016 | Gopalakrishnan | H04W 24/02 455/67.11 |
| 2016/0255509 A1* | 9/2016 | Imran | H04W 4/029 455/414.2 |
| 2016/0286407 A1* | 9/2016 | Simonsson | H01Q 1/246 |
| 2016/0345183 A1* | 11/2016 | Hamalainen | H04W 16/28 |
| 2018/0109962 A1* | 4/2018 | Nilsson | H04B 7/022 |

FOREIGN PATENT DOCUMENTS

| CN | 102136630 A | 7/2011 |
| EP | 3 136 628 A1 | 3/2017 |
| JP | 2013-223190 A | 10/2013 |
| WO | 2014/114268 A1 | 7/2014 |

OTHER PUBLICATIONS

European Extended Supplementary Search Report dated May 25, 2018 received in European Patent Application No. 16 81 6917.5.
International Search Report dated Mar. 25, 2016 issued in PCT/CN2016/072744.

* cited by examiner

METHOD AND APPARATUS FOR DETECTING CONNECTION LINE ORDER OF ELECTRICAL TILTING ANTENNA

CROSS REFERENCE

This application is the 371 application of PCT Application No. PCT/CN2016/072744 filed Jan. 29, 2016, which is based upon and claims priority to Chinese Patent Application No. 201510369065.8, filed on Jun. 29, 2015, the entire contents thereof are incorporated herein by reference.

TECHNICAL FIELD

The present disclosure relates but is not limited to the field of communication technology, and more particularly, to a method and apparatus for detecting connection line order of electrical tilt antenna.

BACKGROUND

In wireless communication system, there are many wireless key technologies that are inseparable from the antenna configuration. For example, Multiple Input Multiple Output (MIMO), refers to a technology that transmitters use multiple transmitting antennas and receivers use multiple receiving antennas respectively, making the signal transmitted and received through multiple antennas of the transmitters and receivers. If channel responses of each transmitting and receiving antenna are independent and not relevant, the MIMO system can create multiple channels with parallel spaces to improve the quality of communication. For a lower spatial correlation in a multiple antennas transmission system, orthogonal polarized antennas or multiple non-polarized antennas with adequate space intervals are used in the application.

In wireless network, orthogonal polarization antennas (also known as dual polarized antenna) are most commonly used. An orthogonal polarization antenna has two portals, respectively corresponding to +45 degrees and −45 degrees polarized arrays. For a one-facet dual-polarized antenna, it does not raise objections to connection line order when connecting to a base station. However, it raises objections to connection line order when a multiple-facets dual-polarized antenna connects to a multichannel base station, such as 2T4R base station (two transmitting channel, and four receiving channels) or 4T4R base station (four transmitting channels, and four receiving channels). For example, for a 2T4R base station, if a downlink transmission mode (TM) is TM3 (multi-user MIMO dual stream mode), two transmitting channels of the base station shall be connected to ±45 degrees polarization antennas orthogonal to each other on the same side, to ensure the requirement of weak correlation between the transmitting channels. Thus, a terminal is able to choose to enter into the high-rate TM3 mode when signal meets the requirements. If the two transmitting channels connect to antennas with a same polarization direction, the correlation between the transmitting channels will be too strong for the terminal to work under TM3 mode, which leading the capacity of data throughput to halve, the KPI (Key Performance Indicator,) of the wireless networks to worsen, the coverage to shrink, the rate of call-drop to increase, and the success rate of the cut over to lower. Ultimately, the quality of the network is affected.

At present, in wireless network construction and maintenance the problem of antenna system is often hard to be found and identified. It is usually inspected manually. It drains a lot on manpower and material resources, and increases the engineering and maintenance costs.

This section provides background information related to the present disclosure which is not necessarily prior art.

SUMMARY

The following is an overview of the topic in detail in this article. The overview is not intended to limit the protection scope of the claims.

The embodiments of the present disclosure provide a method and apparatus for automatically detecting connection line order of electrical tilt antennas. Without manual inspection, it can effectively reduce engineering and maintenance costs.

According to a first aspect of the embodiments of the present disclosure, there is provided a method for automatically detecting connection line order of electrical tilt antennas, including: adjusting, by electrical adjustment unit, electric down-tilts of electrical tilt antennas corresponding to the electrical adjustment unit, and collecting, by antenna portals, pre-determined parameters of reflected signals corresponding to n electric down-tilts, wherein n is an integer greater than 2; calculating statistical characteristic parameters of the pre-determined parameters according to the values of the pre-determined parameters of the reflected signals corresponding to n electric down-tilts and a pre-determined mathematical statistics algorithm, the statistical characteristic parameters being used to represent the discrete degree of the pre-determined parameters; and if the value of the statistical characteristic parameter is greater than a pre-determined threshold, the connection line order between the electrical tilt antennas and a base station being determined correctly.

According to a second aspect of the embodiments of the present disclosure, the embodiments of the present disclosure provide an apparatus for automatically detecting connection line order of electrical tilt antennas, including: acquisition unit, configured to adjust the down-tilts of electrical tilt antennas corresponding to an electrical adjustment unit by the electrical adjustment unit, collect the pre-determined parameters of reflected signals corresponding to n electric down-tilts by antenna portals, wherein n is an integer greater than 2; computing unit, configured to calculate statistical characteristic parameters of the pre-determined parameters according to the value of the pre-determined parameters of the reflected signals corresponding to n electric down-tilts and a pre-determined mathematical statistics algorithm, the statistical characteristic parameters being used to represent the discrete degree of the pre-determined parameters; determining unit, configured to if the value of the statistical characteristic parameter is greater than a pre-determined threshold, the connection line order between the electrical tilt antennas and a base station being determined correctly.

According to a third aspect of the embodiments of the present disclosure, the embodiments of the present disclosure provide a non-transitory computer readable storage medium having stored therein computer program instructions, when executed by a processor causes the processor to perform a method above mentioned.

According to a fourth aspect of the embodiments of the present disclosure, the embodiments of the present disclosure provide a device, including: a processor; and a memory configured to store instructions executable by the processor; wherein the processor is configured to perform: adjusting, by an electrical adjustment unit, electric down-tilts of electrical tilt antennas corresponding to the electrical adjustment unit, and collecting, by antenna portals, pre-determined parameters of reflected signals corresponding to n electric down-tilts, wherein n is an integer greater than 2; calculating statistical characteristic parameters of the pre-determined parameters according to the values of the pre-determined parameters of the reflected signals corresponding to n electric down-tilts and a pre-determined mathematical statistics algorithm, the statistical characteristic parameters being used to represent the discrete degree of the pre-determined parameters; and if the value of the statistical characteristic parameter is greater than a pre-determined threshold, the connection line order between the electrical tilt antennas and a base station being determined to be correct.

According to a fifth aspect of the embodiments of the present disclosure, the embodiments of the present disclosure provide a base station administration network center, including a device above mentioned.

The embodiments of the present disclosure also provide a computer storage medium. The computer storage medium stores computer executable instructions. The computer executable instructions are used for performing the methods above.

The embodiments of the present disclosure provide a method and apparatus for automatically detecting connection line order of electrical tilt antennas, including: the electrical adjustment unit adjusts the down-tilt of its corresponding electrical tilt antennas, collects the pre-determined parameter of reflected signals corresponding to n electric down-tilts by antenna portals, wherein n is an integer greater than 2; the statistical characteristic parameters of a pre-determined parameters are calculated according to the value of the pre-determined parameter of reflected signals corresponding to n electric down-tilts and a pre-determined mathematical statistics algorithm. The statistical characteristic parameter is used to represent the discrete degree of the pre-determined parameters; if the value of the statistical characteristic parameter is greater than a pre-determined threshold, the connection line order between the electrical tilt antennas and the base station is determined correctly.

After reading and understanding the drawings and detailed descriptions, other aspects can be understood.

DETAILED DESCRIPTION

References will now be made in detail to exemplary embodiments with the accompanying drawings. It is important to note that the exemplary embodiments and the characteristics of the exemplary embodiments in this application can be combined with each other in the absence of conflict.

The steps in the flow chart of the accompanying drawings can be performed in a computer system within such as a set of computer executable instructions. Although the logical order is shown in the flow chart, in some cases, the steps can be performed in a different order than that are shown or described in this case.

In an exemplary embodiment, when adjusting or scanning the electric down-tilt of an electrical tilt antenna, due to the active mutual coupling between the antenna vibrators and phase shifter S parameter in the electrical adjustment unit (note: S parameter is a network parameter established on the basis of relations between incident wave and reflected wave, suitable for microwave circuit analysis, to describe the circuit network through the reflecting signal of the device portal and signals from the portal to another portal) change, the standing wave or reverse power of the electrical tilt antenna changes. Then the change of the standing wave or reverse power is detected through its connected base station, so as to determine the connection relationship between the base station transmitting portals and the antenna feeder portals.

Figure 1:
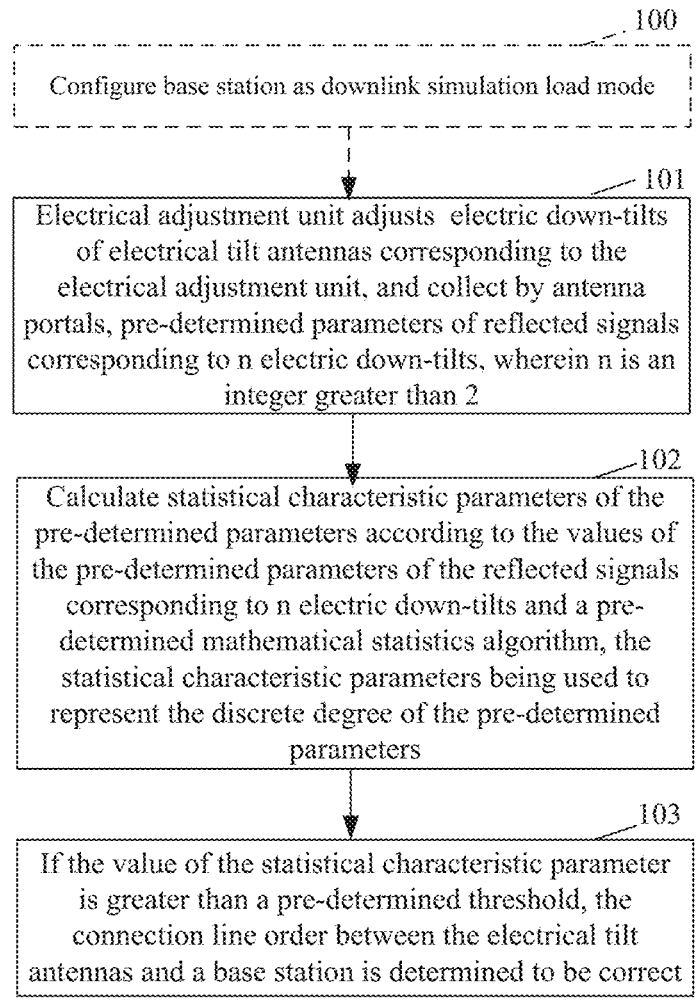
FIG. 1 is a flow chart of the method for automatically detecting connection line order of the electrical tilt antennas according to an exemplary embodiment.

An exemplary embodiment provides a method for automatically detecting connection line order of an electrical tilt antenna. The method can be applied to the base station, as shown in FIG. 1. The method includes:

In step 100, the base station is configured to a downlink simulation load mode.

Alternatively, the downlink simulation load mode includes: no real user equipment accessing to the base station is needed, the base station simulates users' business data to send one-way radio frequency signals, and the signals are transferred to the antenna feeder portals through RF cable (jumper wire), radiating into space by the antenna oscillator.

It should be noted that step 100 is optional in this embodiment. Step 101 can be directly performed without step 100.

In step 101, electrical adjustment unit adjusts the electric down-tilt of its corresponding electrical tilt antennas, and a pre-determined parameter of reflected signals corresponding to n electric down-tilts are collected by antenna portals, wherein n is an integer greater than 2.

Alternatively, the electrical adjustment unit adjusts the electric down-tilt of its corresponding electrical tilt antenna proceeding in accordance with the international antenna standard interface and protocol (Aircraft Service International Group, ASIG). The ASIG interface of the base station is connected to the electrical adjustment unit by a Remote Control Unit (RCU). The electrical adjustment unit is connected to the antenna internal phase shifter components.

The base station network administration center sends commands to the RCU through the base station. After receiving instructions, RCU starts embedded motor to drive electrical adjustment unit, to convert the phase of the antenna oscillator through the phase shifter components, to change the amplitude size of vertical component and horizontal component of field strength of each oscillator radiation. The radiating direction pattern of the corresponding space synthesis changes, ultimately the down-tilt of the antenna's vertical direction pattern changes.

In general, a dual-column polarized electric antenna has an independent electrical adjustment unit. For N column of the antenna system, it could be treated as N/2-facet dual polarized antenna, and with N/2 independent electrical adjustment units.

For the N column antennas, the mth (m=1 ... N/2) electrical adjustment unit corresponding to the antennas is adjusted in turn, and electric down-tilt is stepping traversed according to a certain degree. The base station collects the pre-determined parameters of the reflected signal (or reverse received signals) corresponded to its transmitting channel of each electrical adjustment unit under different electric down-tilts, and the pre-determined parameters of the reflected signal are multi-sampling and statistical recorded. Alternatively, the pre-determined parameter can be a standing wave ratio or a reverse received power of the base station transmitting channel Thus, a data table about the electrical adjustment unit, the electric down-tilt, and the standing wave ratio or reverse received power of the base station transmitting channel can be generated.

To determine the traversal scope of the electric down-tilt, the dynamic range that could be detected and represented should be considered, as well as the impact on the network signal coverage. Therefore, the traversal scope of the electric down-tilt can be weighed and determined according to the actual conditions and the impact on network.

In step 102, statistical characteristic parameters of the pre-determined parameters are calculated according to the value of the pre-determined parameters of the reflected signals corresponding to n electric down-tilts and a pre-determined mathematical statistics algorithm. The configuration of the statistical characteristic parameter is to represent the discrete degree of the pre-determined parameters.

Alternatively, the pre-determined mathematical statistical algorithm includes a variance algorithm; accordingly, the statistical characteristic parameters include variance;

In step 102, the variance of the pre-determined parameters is calculated according to the value of the pre-determined parameters of reflected signals corresponding to n electric down-tilts and the variance algorithm.

It should be noted, for each of the n electric down-tilt angles, the value of the pre-determined parameters of the reflected signal of the same electric down-tilt can be multiply collected. The average value is taken as the value of the pre-determined parameters of the reflected signal of the electric down-tilt. Then the variance is calculated based on this set of n average values with a pre-determined mathematical statistics algorithm (e.g., variance algorithm). The variance can represent the discrete degree of this set of n average values.

In one example, it is assumed that n=4 and the value of the 1st to 4th electric down-tilt is respectively 1 degree, 3 degrees, 5 degrees, and 7 degrees. The values of the four standing wave ratio reflected signal corresponding to the four electric down-tilts (taking the average value by sampling m times for each electric down-tilt) are sampled, and then calculate the variance of the four values. The variance can represent the discrete degree of the four average values.

In step 103, if the value of the statistical characteristic parameter is greater than a pre-determined threshold, the connection line order between the electrical tilt antennas and the base station is determined correctly.

Alternatively, the pre-determined threshold is determined according to the right connection line order between the electrical tilt antenna and the base station.

It should be noted that the pre-determined threshold in the embodiment of this invention can be measured and obtained by the technical personnel based on actual work experience.

The exemplary embodiment of the present disclosure provide a method for automatically detecting connection line order of electrical tilt antennas, including: the electrical adjustment unit adjusts the down-tilt of its corresponding electrical tilt antennas, collects the pre-determined parameters of reflected signals corresponding to n electric down-tilts through antenna portals, n is an integer greater than 2; the statistical characteristic parameters of the pre-determined parameters are calculated according to the value of the pre-determined parameter of reflected signals corresponding to n electric down-tilts and a pre-determined mathematical statistics algorithm. The configuration of the statistical characteristic parameter is to represent the discrete degree of the pre-determined parameters; if the value of the statistical characteristic parameter is greater than a pre-determined threshold, the connection line order between the electrical tilt antennas and the base station is determined correctly. By remote automatic detection of the connection line order between current base stations and antennas, the problem of the antenna system can be found and identified, thus the engineering and maintenance costs can be effectively reduced without the need of manual inspection.

The exemplary embodiments of the present disclosure also provide a computer storage medium. The computer storage medium stores computer executable instructions. The computer executable instructions perform the methods above.

Figure 2:
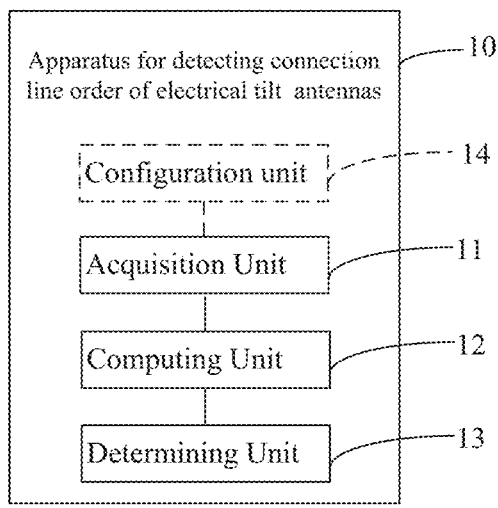
FIG. 2 is a block diagram of the apparatus for automatically detecting connection line order of the electrical tilt antennas according to an exemplary embodiment.

The exemplary embodiments of the present disclosure provide an apparatus 10 for automatically detecting connection line order of electrical tilt antennas. As shown in FIG. 2, the apparatus 10 includes:

acquisition unit 11, configured to adjust the electric down-tilts of electrical tilt antennas corresponding to an electrical adjustment unit by the electric adjustment unit, and collect pre-determined parameters of reflected signals corresponding to n electric down-tilts by antenna portals, wherein n is an integer greater than 2;

computing unit 12, configured to calculate statistical characteristic parameters of the pre-determined parameters according to the values of the pre-determined parameters of the reflected signals corresponding to n electric down-tilts and a pre-determined mathematical statistics algorithm. The statistical characteristic parameter is used to represent the discrete degree of the pre-determined parameters;

determining unit 13, configured to if the value of the statistical characteristic parameter is greater than a pre-determined threshold, the connection line order between the electrical tilt antennas and the base station is determined correctly.

Alternatively, the apparatus 10 includes:

configuration unit 14, configured to configure the base station as a under downlink simulation load mode.

Alternatively, the pre-determined parameters include a standing wave ratio or a reverse receiving power.

Alternatively, the pre-determined threshold is determined according to the right connection line order between the electrical tilt antenna and the base station.

Alternatively, the pre-determined mathematical statistical algorithm includes the variance algorithm; correspondingly, the statistical characteristic parameters include variance;

computing unit 13 can be configured as:

the variance of the pre-determined parameters is calculated according to the value of the pre-determined parameters of reflected signals corresponding to n electric down-tilts and the variance algorithm.

This exemplary embodiment is used for the implementation of the methods of this invention. The work flow and working principles of each unit in this embodiment are in the exemplary embodiment of the methods, and will not be repeated here.

This exemplary embodiments of the present disclosure provide an apparatus for automatically detecting connection line order of electrical tilt antennas, including: the electrical adjustment unit adjusts the electric down-tilt of its corresponding electrical tilt antennas, collects the pre-determined parameters of reflected signals corresponding to n electric down-tilts through antenna portals, n is an integer greater than 2; the statistical characteristic parameters of a pre-determined parameters are calculated according to the value of the pre-determined parameters of the reflected signals corresponding to n electric down-tilts and a pre-determined mathematical statistics algorithm. The configuration of the statistical characteristic parameter is to represent the discrete degree of the pre-determined parameters; if the value of the statistical characteristic parameter is greater than a pre-determined threshold, the connection line order between the electrical tilt antennas and the base station is determined correctly. By remote automatic detection of the connection line order between current base stations and antennas, the problem of the antenna system can be found and identified, thus the engineering and maintenance costs can be effectively reduced without the need of manual inspection.

For ordinary skilled in this art to understand the technical scheme provided by this invention more clearly, the following technical proposal provided by this invention is explained in detail below:

Exemplary Embodiment 1

Figure 3A:
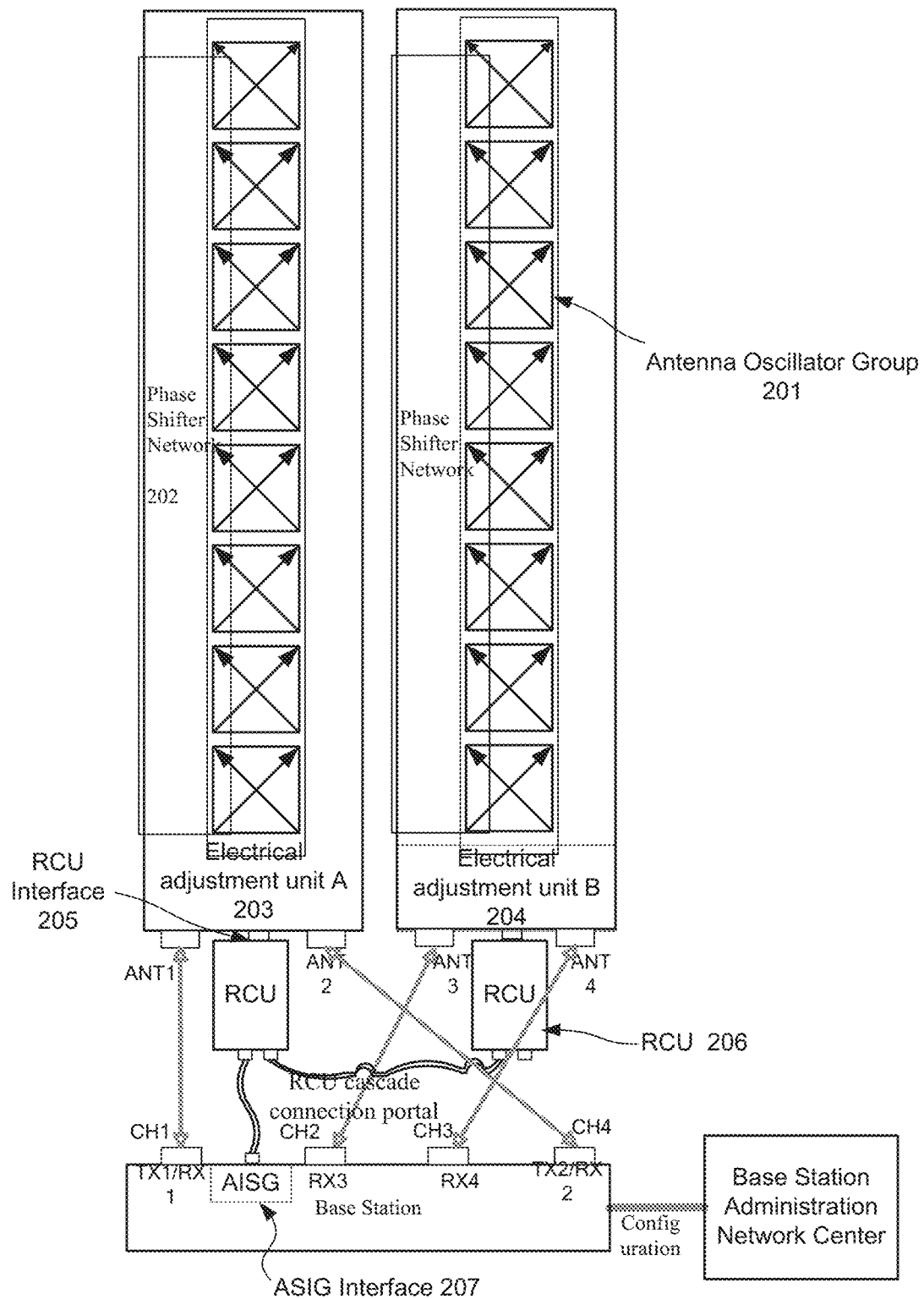
FIG. 3A is a system composed of right line order of 2T4R (2-way transmitting, 4-way receiving) base station and the electrical tilt antennas.

In this exemplary embodiment combined with the exemplary embodiment of the methods, the method for automatically detecting the connection line order of the electrical tilt antennas is as follows:

In one example, a system of 2T4R base station and two facet dual-polarized electrical tilt antenna is shown in FIG. 3a.

The specific connection is as follows: the dual-polarized antenna is composed of antenna oscillator group 201, phase shifter network 202 and electrical adjustment units 203 and 204. Electrical adjustment units 203 and 204 are set to connect the control portal of the external remote control unit (RCU) 206 through the electrical adjustment interface 205. The RCU has cascade function and can cascade another RCU equipment by the cascade portal. The control side of RCU 206 is connected to the ASIG interface 207 of the base station by the signal cable. The radio frequency portals (CH1/CH2/CH3/CH4) of the base station respectively connect to the antenna feeder portals (ANT1/ANT2/ANT3/ANT4) of the polarized antenna through RF cable. It is defined here CH1, CH2, CH3 and CH4 respectively corresponding to the transceiver channel TX1/RX1, receiving channel RX3, receiving channel RX4 and the transceiver channel TX2/RX2 of the base station. According to the configuration requirements of 2T4R base station, the line order of the transmitting channel and the antenna portal requires ANT1 connecting to the CH1(TX1/RX1), and ANT2 to CH4(TX2/RX2). Ultimately, the base station network administration center connects to the base station, and configures the base station and the electrical tilt antennas.

The steps of this exemplary embodiment are as follows:

In step 1, base station works under downlink simulation load mode.

Remotely configure the base station in downlink simulation load mode through base station network administration center, simulate user service to distribute the business data, to simulate the real scene of the base station measuring standing wave ratio or reverse power.

In step 2, configure electric down-tilt of the electrical tilt antennas to sample and calculate the standing wave ratio or reverse receiving power of the transmitting channel CH1 and CH4.

When the base station work normally, base station network administration center sends the RCU 206 instructions through the base station ASIG interface 207 to configure electric down-tilt. After RCU 206 receives the instructions, the motor rotates to drive the electrical adjustment units 203, 204, and completes the operation on the phase shifter network 202. Thus, the phase of the antenna oscillator group 201 vibrates. The electric down-tilt of the antenna's vertical direction pattern changes.

Every time electric down-tilt is adjusted by the electrical adjustment unit, the standing wave ratio (VSWR_TX1/VSWR_TX2) or reverse received power (REV_TX1/REV_TX2) of the transmitting channel CH1 and CH4 is sampled and counted. The down-tilt is stepped and traversed to certain degrees (taking 1 degree for example). The standing wave ratio or reverse receiving power corresponding to the transmitting channel CH1 and CH4 are obtained respectively. As shown in table 1.

TABLE 1

| down-tilt | -1 degrees | -2 degrees | -3 degrees | -4 degrees | -5 degrees | -6 degrees | -7 degrees | -8 degrees | -9 degrees | Statistical characteristic parameters |
|---|---|---|---|---|---|---|---|---|---|---|
| Electrical adjustment unit A | | | | | | | | | | |
| VSWR_TX1/REV_TX1(CH1) | a1 | b1 | c1 | d1 | e1 | f1 | g1 | h1 | i1 | ΔTX1_A |
| VSWR_TX2/REV_TX2(CH4) | a2 | b1 | c2 | d2 | e2 | f2 | g2 | h2 | i2 | ΔTX2_A |
| Electrical adjustment unit B | | | | | | | | | | |
| VSWR_TX1/REV_TX1(CH1) | a3 | b3 | c3 | d3 | e3 | f3 | g3 | h3 | i3 | ΔTX1_B |
| VSWR_TX2/REV_TX2(CH4) | a4 | b4 | c4 | d | e4 | f4 | g4 | h4 | 14 | ΔTX4_B |

In step 3, calculate the statistical characteristic parameters of the channel standing wave ratio or reverse receiving power of the transmitting channels as electric down-tilts changes.

With reasonable data processing and analysis of the table obtained in step 2, the statistical characteristic parameters (such as variance) $\Delta TX1\_A$ and $\Delta TX2\_A$ of the standing wave ratio or reverse receiving power of the transmitting channels CH1 and CH4 can be obtained when the electrical adjustment unit A adjusts electric down-tilt. When the RCU B adjusts electric down-tilts, the statistical characteristic parameters of the standing wave ratio or reverse receiving power of the transmitting channel CH1 and CH4 are $\Delta TX1\_B$ and $\Delta TX2\_B$. The above statistical characteristic parameters should be able to truly represent that it's caused only by the change of electric down-tilts.

In step 4, according to the antenna line order configuration requirements and the pre-determined threshold value, the four statistical characteristic parameters obtained in step 3 are determined, and the correctness of the antennas line order is given.

A pre-determined threshold value X is set up according to the system. It is compared to the 4 variables obtained in step 3. The following results are obtained, as shown in table 2:

TABLE 2

| $\Delta TX1\_A \geq X$ | $\Delta TX1\_B \geq X$ | $\Delta TX2\_A \geq X$ | $\Delta TX2\_B \geq X$ |
|---|---|---|---|
| True | False | True | False |

Optionally, according to the configuration requirements of 2T4R antenna, as shown in table 3.

TABLE 3

| Configuration Requirements of 2T4R Antenna | | | |
|---|---|---|---|
| CH1<—> RCU A | CH3<—> RCU B | CH4<—> RCU B | CH4<—> RCU A |

The following decisions can be made, as shown in table 4:

TABLE 4

| $\Delta TX1\_A \geq X$ | $\Delta TX1\_B \geq X$ | $\Delta TX2\_A \geq X$ | $\Delta TX2\_B \geq X$ |
|---|---|---|---|
| CH1 <—> RCU A | — | CH4 <—> RCU A | — |

According to the determinations above, CH1 and CH4 are connected to two column polarized antenna arrays under the same RCU A. The connection in FIG. 3A meets the antenna configuration requirements of the 2T4R system, thus the line order between the electrical tilt antennas and the base station is determined to be correct.

Exemplary Embodiment 2

Figure 3B:
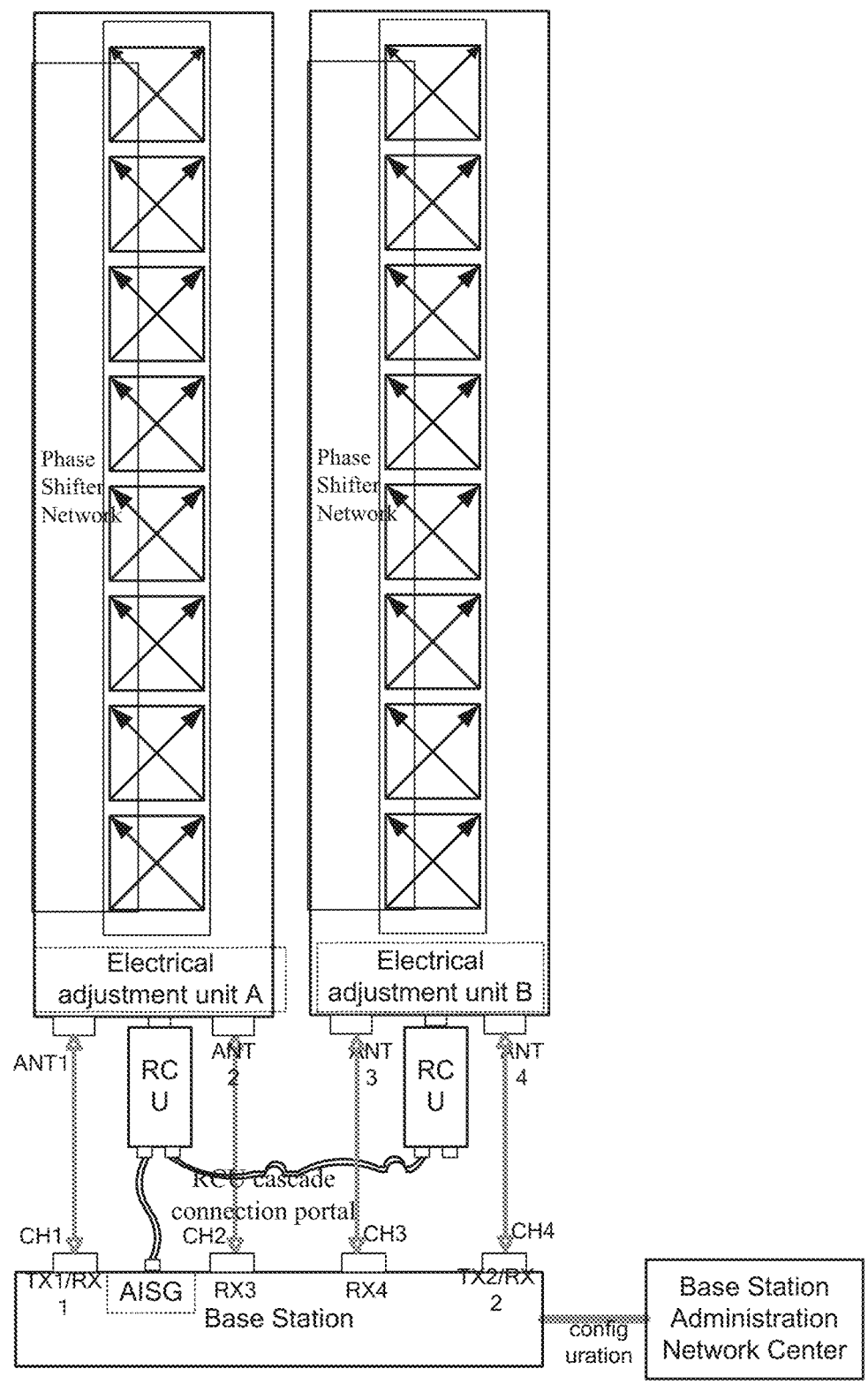
FIG. 3B is a system composed of wrong line order of 2T4R (2-way transmitting, 4-way receiving) base station and the electrical tilt antennas.

For the network configuration system as shown in FIG. 3b, following the same steps 1, 2, 3 and 4 as in the exemplary embodiment 1, the following results can be obtained, as shown in table 5:

TABLE 5

| $\Delta TX1\_A \geq X$ | $\Delta TX1\_B \geq X$ | $\Delta TX2\_A \geq X$ | $TX2\_B \geq X$ |
|---|---|---|---|
| True | False | False | True |

Optionally, according to the requirements of 2T4R antenna configuration as shown in the exemplary embodiment 2, the following determinations can be made, as shown in table 6:

TABLE 6

| $\Delta TX1\_A \geq X$ | $\Delta TX1\_B \geq X$ | $\Delta TX2\_A \geq X$ | $\Delta TX2\_B \geq X$ |
|---|---|---|---|
| CH1<—> RCU A | — | — | CH4<—> RCU B |

According to the determinations above, CH1 are connected to the antenna array that the RCU A located. CH4 are connected. to the antenna array that the RCU B located The antenna configuration requires two transmitting channels must be on the same facet of the antenna. So the connection in FIG. 3B does not conform to the antenna configuration requirements of the 2T4R system. Thus, that the line order between the electrical tilt antennas and the base station is determined to be wrong.

Exemplary Embodiment 3

Figure 4A:
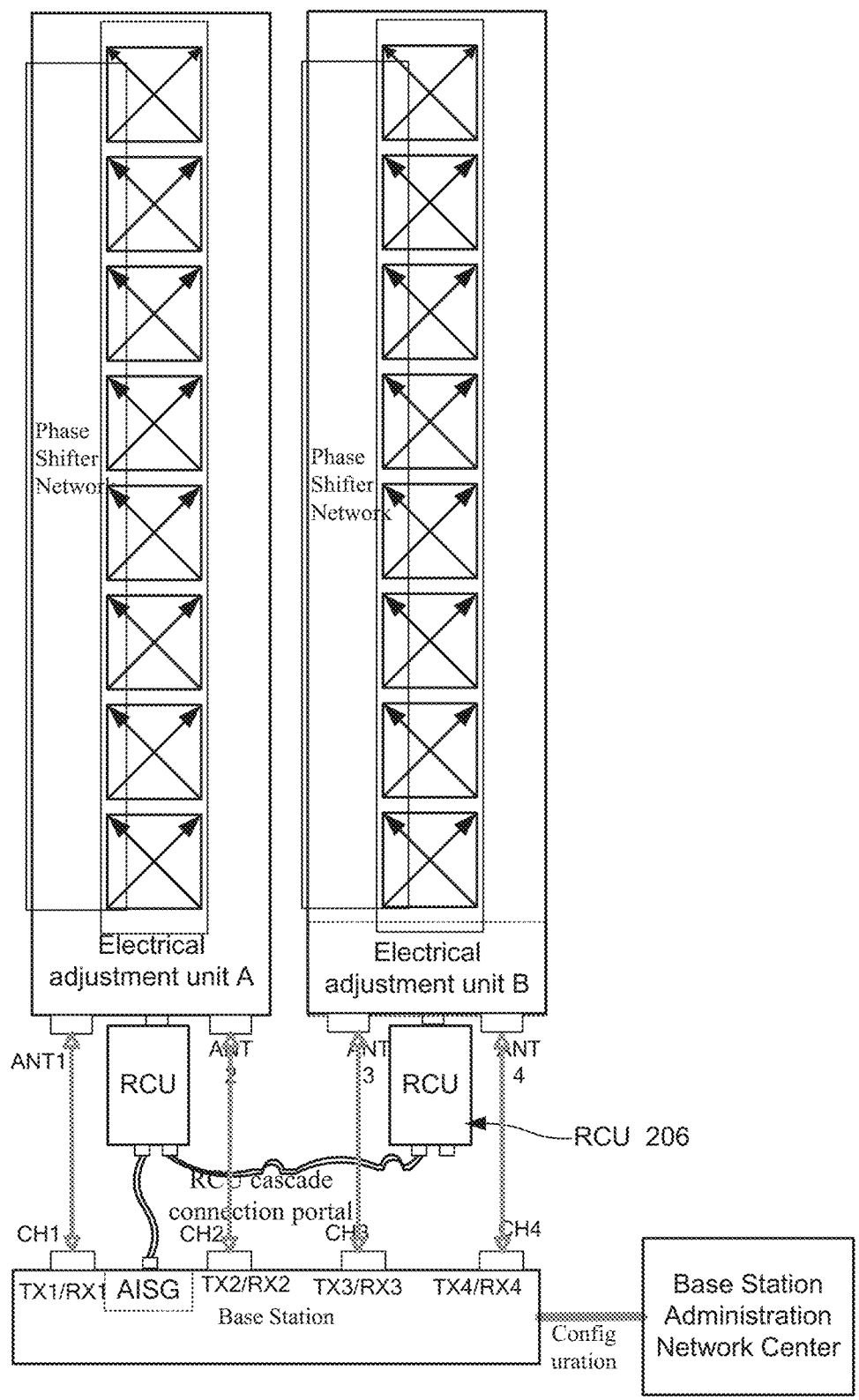
FIG. 4A is a system composed of right line order of 4T4R (4-way transmitting, 4-way receiving) base station and the electrical tilt antennas.

In the network configuration system as shown in FIG. 4A, following the same steps 1, 2, 3 and 4 in the exemplary embodiment 1, the following results can be obtained, as shown in table 7:

TABLE 7

| $\Delta TX1\_A \geq X$ | $\Delta TX1\_B \geq X$ | $\Delta TX2\_A \geq X$ | $\Delta TX2\_B \geq X$ | $\Delta TX3\_A \geq X$ | $\Delta TX3\_B \geq X$ | $\Delta TX4\_A \geq X$ | $\Delta TX4\_B \geq X$ |
|---|---|---|---|---|---|---|---|
| True | False | True | False | False | True | False | True |

Optionally, according to the following 4T4R antenna configuration requirements, as shown in table 8:

TABLE 8

| Antenna Configuration Requirements of 4T4R | | | |
|---|---|---|---|
| CH1<—> RCUA | CH2<—> RCUA | CH3<—> RCUB | CH4<—> RCUB |

The following determination can be made, as shown in Table 9:

TABLE 9

| Δ TX1_A≥X | ΔTX1_B≥X | ΔTX2_A≥X | ΔTX2_B≥X | ΔTX3_A≥X | ΔTX3_B≥X | ΔTX4_A≥X | ΔTX4_B≥X |
|---|---|---|---|---|---|---|---|
| CH1<-><br>RCU A | False | CH<-><br>RCU A | False | False | CH3<-><br>RCU B | False | CH4<-><br>RCU B |

According to the determination above, CH1 and CH2 are connected to antenna array that RCU A is located. CH3 and CH4 are connected to antenna array that RCU B is located. The connection in FIG. 4A conforms to the antenna configuration requirements of 4T4R system, so the connection line order between the electrical tilt antennas and the base station is determined to be correct.

Exemplary Embodiment 4

Figure 4B:
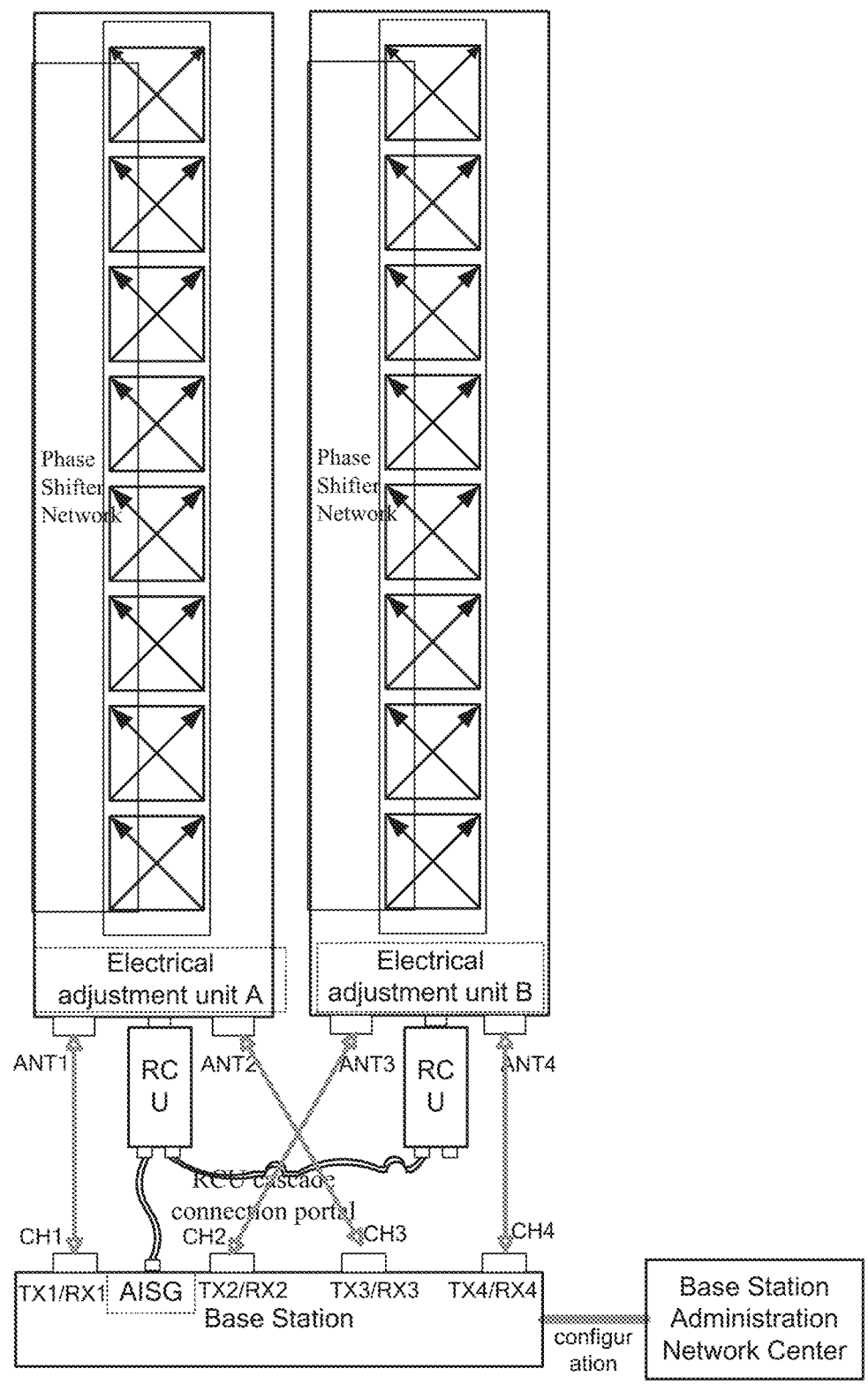
FIG. 4B is a system composed of wrong line order of 4T4R (4-way transmitting, 4-way receiving) base station and the electrical tilt antennas.

For the network configuration system as shown in FIG. 4B, according to the steps 1, 2, 3 and 4 as in the exemplary embodiment 1, the following results can be obtained, as shown in table 10:

TABLE 10

| Δ TX1_A≥X | ΔTX1_B≥X | ΔTX2_A≥X | ΔTX2_B≥X | ΔTX3_A≥X | ΔTX3_B≥X | ΔTX4_A≥X | ΔTX4_B≥X |
|---|---|---|---|---|---|---|---|
| True | False | False | True | True | False | False | True |

Optionally, according to the 4T4R antenna configuration requirements in the exemplary embodiment 3, the following determination can be made as shown in table 11:

TABLE 11

| Δ TX1_A≥X | ΔTX1_B≥X | ΔTX2_A≥X | ΔTX2_B≥X | ΔTX3_A≥X | ΔTX3_B≥X | ΔTX4_A≥X | ΔTX4_B≥X |
|---|---|---|---|---|---|---|---|
| CH1<-><br>RCU A | False | CH2<-><br>RCU B | False | CH3<-><br>RCU A | False | False | CH4<-><br>RCU B |

According to the determination above, CH1 and CH3 are connected to antenna array that RCU A is located. CH2 and CH4 are connected to antenna array that RCU B is located. The connection in FIG. 4B does not conform to the antenna configuration requirements of the 4T4R system, so the connection line order between the electrical tilt antennas and the base station is determined to be incorrect.

The exemplary embodiments of the present disclosure provide a method and apparatus for automatically detecting connection line order of electrical tilt antennas. It makes use of the characteristics that the electrical adjustment of the electrical tilt antenna changes the antenna standing wave ratio or the reverse receiving power. It should be configured for an automatic identification and diagnosis on the cable connections line order between the multi-channel base stations and antenna systems. By configuring the electrical adjustment unit of each electrical tilt antenna in turn, the electric down-tilt changes. Meanwhile the base station samples the reverse receiving power or the standing wave ratio of every transmitting channel, and calculates the statistical characteristic parameters of reverse receiving power or standing wave ratio of every transmitting channel according to the pre-determined statistics algorithm. If the statistical characteristic parameter corresponding to every channel is greater than a pre-determined threshold value, then the channel and the antenna portals of the electrical adjustment unit are determined to be connected together. Ultimately, the connection line order between the multi-channel base stations and the antenna system is determined to be correct or not based on the system requirements of the antenna configuration. The technical solution provided by the exemplary embodiments of this invention can effectively reduce the manual cost of network engineering deployment, network optimization and network layout. It can also increase the network delivery speed, and improve network quality and consumer satisfaction.

It shall be understood that the exemplary embodiments above is only schematic. For example, the partition of the module is only divided by logical function. It can be divided in other ways. Also, the connections between the modules that are displayed or discussed can be through several interfaces. The interfaces can be electrical, mechanical, or other forms. Each module may or may not be physically separate, may or may not be a physical unit. It is possible to choose some or all of the modules to realize the purpose of the exemplary embodiments.

In addition, each function module of the exemplary embodiments of this invention can be integrated in one processing module, or each module can be physically separated. It can also be two or more than two modules integrated in one module. The integrated modules can be implemented in hardware or in the form of hardware combined with software modules.

The integrated module implemented as a software functional unit, can be stored in a computer readable storage medium. The software function modules are stored in a storage medium including several instructions to make a computer equipment (personal computer, server, or network device, etc.) perform part of the processes of the method in the exemplary embodiments of this invention. The storage medium includes: USB flash disk, mobile hard disk, read-only Memory (ROM), Random Access Memory (RAM), disk or CD and other medium which can store the program code.

The description of the above is only for the specific exemplary embodiments of this invention, the protection scope of this invention is not limited to such description. The changes or alternatives that could be easily thought of by the technical personnel familiar with this art should be covered within the protection scope of this invention. Therefore, the protection scope of this invention shall be subject to the protection scope of the claims.

INDUSTRIAL PRACTICABILITY

The technical schemes can automatically and remotely detect the connection line order between the current base station and antennas, so as to find and identify the problems of the antenna system. With no need of manual checking, the engineering and maintenance costs can be effectively reduced.

What is claimed is:

1. A method for automatically detecting the connection line order of electrical tilt antennas, apply to a base station system, wherein the base station system comprises a base station, a base station network administration center, and electrical tilt antennas which comprise an electrical adjustment unit and antenna portals, and the method comprises:
   adjusting, by the electrical adjustment unit, electric down-tilts of electrical tilt antennas corresponding to the electrical adjustment unit, and collecting, by the antenna portals, pre-determined parameters of reflected signals corresponding to n electric down-tilts, wherein n is an integer greater than 2;
   calculating, by the base station network administration center, statistical characteristic parameters of the pre-determined parameters according to the values of the pre-determined parameters of the reflected signals corresponding to n electric down-tilts and a pre-determined mathematical statistics algorithm, the statistical characteristic parameters being used to represent the discrete degree of the pre-determined parameters; and
   in response to determining that a value of the statistical characteristic parameter is greater than a pre-determined threshold, determining, by the base station network administration center, that the connection line order between the electrical tilt antennas and the base station is correct.

2. The method according to claim 1, further comprising:
   before the method applies, the base station being configured as a downlink simulation load mode.

3. The method according to claim 1, wherein the pre-determined parameters comprise a standing wave ratio or a reverse receiving power.

4. The method according to claim 1, wherein the pre-determined threshold is determined according to the correct connection line order between the electrical tilt antennas and the base station.

5. The method according to claim 4, wherein the pre-determined mathematical statistical algorithm comprises a variance algorithm;
   the statistical characteristic parameters include variance; and
   calculating, by the base station network administration center, the statistical characteristic parameters of the pre-determined parameter according to the values of the pre-determined parameters of the reflected signals corresponding to n electric down-tilts and a pre-determined mathematical statistics algorithm comprises:
   calculating, by the base station network administration center, a variance of the pre-determined parameters according to the value of the pre-determined parameters of reflected signals corresponding to n electric down-tilts and the variance algorithm.

6. A non-transitory computer readable storage medium having stored therein computer program instructions, when executed by a processor causes the processor to perform a method according to claim 1.

7. An apparatus for automatically detecting the connection line order of electrical tilt antennas, apply to a base station system, wherein the base station system comprises a base station, a base station network administration center, and electrical tilt antennas which comprise an electrical adjustment unit and antenna portals, and the apparatus comprise a processor and the following units executed by the processor:
   acquisition unit, configured to use the electrical adjustment unit to adjust electric down-tilts of electrical tilt antennas corresponding to an electrical adjustment unit, and operate the antenna portals to collect pre-determined parameters of reflected signals corresponding to n electric down-tilts, wherein n is an integer greater than 2;
   computing unit, configured to use the base station network administration center to calculate statistical characteristic parameters of the pre-determined parameters according to the values of the pre-determined parameters of the reflected signals corresponding to n electric down-tilts and a pre-determined mathematical statistics algorithm, the statistical characteristic parameters being used to represent the discrete degree of the pre-determined parameters;
   determining unit, configured to use the base station network administration center to determine that connection line order between the electrical tilt antennas and base station is correct in response to determining that a value of the statistical characteristic parameter is greater than a pre-determined threshold.

8. The apparatus according to claim 7, further comprising:
   configuration units, configured to use the base station network administration center to configure the base station as a downlink simulation load mode.

9. The apparatus according to claim 7, wherein the pre-determined parameters comprise a standing wave ratio or a reverse receiving power.

10. The apparatus according to claim 7, wherein the pre-determined threshold is determined according to the correct connection line order between the electrical tilt antennas and the base station.

11. The apparatus according to claim 10, wherein the pre-determined mathematical statistical algorithm comprises a variance algorithm;
   the statistical characteristic parameters include variance; and
   the computing units, configured to use the base station network administration center to calculate a variance of the pre-determined parameters according to the value of the pre-determined parameters of the reflected signal corresponding to n electric down-tilts and the variance algorithm.

12. A device, comprising:
   a processor; and
   a memory configured to store instructions executable by the processor;
   wherein the processor is configured to:
   operate an electrical adjustment unit of electrical tilt antennas in a base station system to adjust electric down-tilts of electrical tilt antennas corresponding to the electrical adjustment unit, and operate antenna portals of the electrical tilt antennas to collect pre-determined parameters of reflected signals corresponding to n electric down-tilts, wherein n is an integer greater than 2;
   calculate statistical characteristic parameters of the pre-determined parameters according to the values of the pre-determined parameters of the reflected signals corresponding to n electric down-tilts and a pre-determined mathematical statistics algorithm, the statistical characteristic parameters being used to represent the discrete degree of the pre-determined parameters; and determine that connection line order between the electrical tilt antennas and base station is correct in response to determining that a value of the statistical characteristic parameter is greater than a pre-determined threshold.

13. The device according to claim 12, wherein the processor is further configured to:

before the method applies, configure the base station being configured as a downlink simulation load mode.

14. The device according to claim 12, wherein the pre-determined parameters comprise a standing wave ratio or a reverse receiving power.

15. The device according to claim 12, wherein the pre-determined threshold is determined according to the correct connection line order between the electrical tilt antennas and the base station.

16. The device according to claim 15, wherein the pre-determined mathematical statistical algorithm comprises a variance algorithm;

the statistical characteristic parameters include variance; and the processor is configured to calculate the statistical characteristic parameters of the pre-determined parameter according to the values of the pre-determined parameters of the reflected signals corresponding to n electric down-tilts and a pre-determined mathematical statistics algorithm by:

calculating a variance of the pre-determined parameters according to the value of the pre-determined parameters of reflected signals corresponding to n electric down-tilts and the variance algorithm.

17. A base station system, comprising a device according to claim 12.

* * * * *